United States Patent

[11] 3,626,293

[72] Inventors Stuart Alexander Andrews
Elstree;
Morgan Wynne Lewis, Bushey Heath, both of England
[21] Appl. No. 41,721
[22] Filed May 27, 1970
[45] Patented Dec. 7, 1971
[73] Assignee Rolls-Royce Limited
Derby, England
[32] Priority Nov. 9, 1966
[33] Great Britain
[31] 50,218/66
Continuation of application Ser. No. 681,875, Nov. 11, 1967, now abandoned. This application May 27, 1970, Ser. No. 41,721

[54] CIRCUIT FOR INDICATING VARIATIONS IN MARK-TO-SPACE RATIO
3 Claims, 1 Drawing Fig.

[52] U.S. Cl. ............................................. 324/140 D,
324/83 A, 324/89

[51] Int. Cl. ............................................. G01r 7/00,
G01r 25/00
[50] Field of Search ............................................. 324/89, 83
A, 140 R; 328/109, 133; 307/232; 330/23

[56] References Cited
UNITED STATES PATENTS
3,389,273   6/1968   Haines.......................... 307/310
FOREIGN PATENTS
907,328   10/1962   Great Britain................ 324/140 R
OTHER REFERENCES
Lacy; Elec. Engr., pp. 148–150; Mar. 1967.

Primary Examiner—Alfred E. Smith
Attorney—Mawhinney and Mawhinney

ABSTRACT: A phase-comparing circuit has two paths switched on and off alternately by the signals to be compared and a meter measures the average difference between the currents in the paths. Both currents are partly determined by a common transistor and by a respective transistor in the two paths, and temperature changes affect the three transistors equally to give temperature compensation to the meter reading.

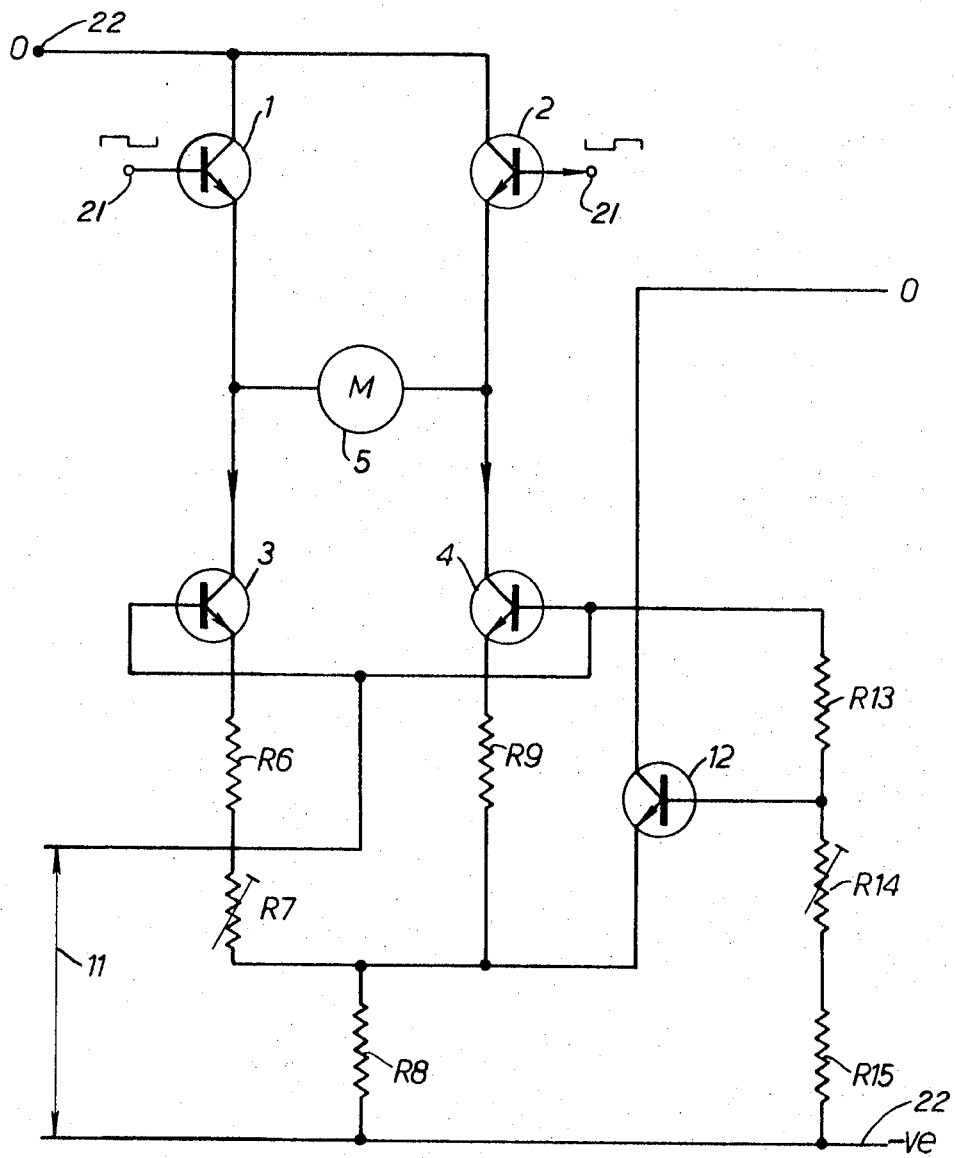

CIRCUIT FOR INDICATING VARIATIONS IN MARK-TO-SPACE RATIO

This is a continuation of application Ser. No. 681,875, filed Nov. 11, 1967, and now abandoned.

This invention relates to a circuit for comparing the phase of two signals, for example the two square wave signals which can be derived from the two relatively angularly movable discs employed in some forms of torque meter. Thus the invention is applicable to the torque meter the subject of British Pat. Nos. 968,503 and 43,119/66 but this is only one application of the invention.

According to the present invention the circuit includes two conducting paths arranged to conduct alternately in according with the signals to be compared each including an electronic device for partially determining the current when that path is conducting, and means for measuring the mean difference between the currents in the two paths, the current value in the paths when they conduct being also partially determined by a third electronic device, and the three electronic devices exhibiting similar changes in their characteristics with temperature whereby a temperature change of the first and second electronic devices which would cause a change in current value in the paths compensated for by the effect of the equivalent change in temperature of the third device. Each path may also include a transistor or other switch device for controlling conduction of that path in dependence on the corresponding signal.

Prior phase comparing circuits have tended to be unreliable when used at a temperature other than a predetermined temperature partly due to the change in the characteristics of the valves, transistors, or equivalent electronic devices, used in them, but by using two such devices to determine the current value and arranging for both devices to change in the same way with temperature it can be arranged for the current value to remain more nearly the same at different temperatures.

Preferably the electronic devices are three-electrode transistors, and in one embodiment of the invention employing transistors, the bases or control electrodes are biassed by a common reference voltage and the two conducting paths have respective resistive portions connected between another electrode of the third device and corresponding electrodes of the first and second devices. If the voltages of the electrodes of the three devices in the current paths all change together with temperature it follows that the potentials drops across the resistive portions and hence the currents in them will remain substantially constant in spite of temperature changes.

One of the resistive portions may be adjustable to set the zero so that the currents in the two conducting paths are equal and the mean difference between them is zero when the signals have no phase displacement from a nominal phase relationship.

Similarly the bias on the control electrode in the third device may be adjusted to set a meter of the mean current difference to have full scale deflection at a desired phase difference between the two signals.

Moreover the bias on the control electrodes of the devices can be derived from a circuit including a resistor with a high-temperature coefficient of resistance, which is subjected to the same temperature as the instrument providing the two signals for comparison, so that there can be some built-in compensation for temperature changes in the instrument itself.

Preferably a meter is connected to carry the currents in the two paths in opposite senses so that the indication will be of the mean difference between the currents in the two paths.

The invention may be carried into practice in various ways and one embodiment will now be described by way of example with reference to the accompanying drawing of which the single FIG. is diagram of a mark-to-space ratio determining circuit. In the application being described, a torque measured by a torque meter determines the mark-to-space ratio of a square wave, and the circuit to be described provides a current dependent on this ratio.

Two signals are supplied to the bases of respective switching transistors 1 and 2. The signals are in the form of rectangular waves having complementary marks and spaces, that is to say, each wave has marks coincident with spaces in the other wave and appear at a service 21 having two terminals. For zero torque, the mark-to-space ratios are unity but as the torque is increased, the ratios depart increasingly from unity.

The transistors 1 and 2 are connected with two other transistors 3 and 4 in two parallel paths, and DC meter movement 5 is connected across the junctions between the two series transistors in each path. The emitter circuit of transistor 3 includes a resistive load comprising a resistor R6 and an adjustable resistor R7 along with a resistor R8. Resistor R8 is common to the emitter circuit of transistor 4, which also includes a resistive load comprising a resistor R9. The transistors 1 and 2 are beamed to be switched on by the positive marks of the waves they receive and to switch off during the spaces. Because the waves are complementary this will mean that transistor 1 will be on when transistor 2 is off and vice versa. Transistors 3 and 4 are biased at 11 to be 'on' continually.

The arrangement is such that when transistor 1 is switched on by the leading edge of the mark applied to it, the current through the transistor 1, will flow in two paths, one containing the transistor and resistor 3 and resistors R6, R7 and R8, and the other containing the meter 5, the transistor 4, and the resistors R9 and R8. A source of current 22 is connected between the end of the resistor R8 and the common collectors of the transistors 1 and 2. When the space of the wave at the base of transistor 1 occurs, this transistor switches off. At the same time the base of the transistor 2 experiences the leading edge of a mark and in switched on causing current flow through the transistor 2 and then through one path containing the transistor 4 and resistors R9 and R8 and another containing the meter 5, the transistor 3, and the resistors R6, R7 and R8.

Thus, the meter 5 conducts currents in opposite directions in the two cases.

If the mark-to-space ratio is exactly unity the meter will conduct current in opposite directions for equal times and if the resistor R7 is adjusted to make the currents through transistors 3 and 4 the same, a zero indication of the meter, which represents the time average current in it, will indicate this ratio of unity or zero torque. If now the mark-to-space then in each square wave cycle the meter will conduct current in direction for a certain time and in the other direction for a different time, and there will be a net average current in the meter to produce an indication of the degree of torque change.

The bases of the transistors 3 and 4 are biassed from a precision voltage reference 11 and the same reference is used to bias the base of a third or compensating transistor 12 by use of potential divider consisting of a fixed resistor R13, an adjustable resistor R14 for setting the full scale deflection of the meter and a temperature compensating resistor R15. The emitter of transistor 12 is connected between resistor R8 on the one hand and resistors R7 and R9 on the other. The emitter voltages of the transistors 3, 4 and 12, are set by their base biases and the difference between the emitter voltages of the transistors 3 and 4 and that of the transistor 12 determines the value of the current flowing in the two conducting paths when conduction takes place. By setting the resistor R14 this current value can be set to give full-scale deflection of the meter 5 for a desired mark-to-space ratio equivalent to be desired torque.

If now, the temperature changes, so that the transistors 3, 4 and 12 operate at a different part of their characteristics, this will not upset the accuracy of the instrument provided the three transistors are chosen to have similar temperature characteristics relating their emitter voltages to their base biases Thus, if due to such a temperature change the voltages of the emitters change the emitter voltages of all the transistors will change. Therefore the potential difference across the resistor R6 and R7 on the one hand and R9 on the other hand will remain the same and the current through transistor 3 and 4 will be unaffected by the temperature change so that the meter reading will be also unaffected.

The resistor R15 is arranged to be subjected to the same temperature as the torque shaft which with a generator provides indirectly the signals on the bases of the transistors 1 and 2, and it is chosen to have a high-temperature coefficient of resistance, so that compensation is obtained for changes in the mark-to-space ratio of the signals due to temperature changes of the torque shaft from which the signals are derived.

What is claimed is:

1. A circuit for indicating variations in the mark-to-space ratio of a square wave signal comprising:
   1. a source of a square wave signal of variable mark-to-space ratio and a source of current,
   2. first and second switches, first and second connection points, and first and second main transistors,
   3. connections from said source through:
      i. in series connection, the first switch, the first connection point, the first main transistor,
      ii. in series connection, the second switch, the second connection point, the second main transistor,
   4. a meter connected between the first and second connection points, said first and second switches respectively being arranged to be switched on by a first portion of said square wave signal and by the complementary portion of said signal, whereby when said first portion is present current flows:
   a. through said first switch, said first connection point and first main transistor, and,
   b. through said first switch, said first connection point, said meter, said second connection point and said second main transistor;

and when said complementary portion is present current flows;
   c. through said second switch, said second connection point and said second main transistor, and,
   d. through said second switch, said second connection point, said meter, said first connection point and said first main transistor;

so that the meter indicates variations in said mark-to-space ratio.

2. A circuit according to claim 1 including a compensating transistor having similar temperature characteristics and being arranged in the same environment as the first and second main transistors and being connected to compensate for changes in current in the main transistors due to changes in temperature.

3. A circuit according to claim 2 including a first resistive load and a third connection point in series connection with the first main transistor; a second resistive load and said third connection point in series connection with said second main transistor; and a third resistive load connected to said third connection point; biasing means arranged to apply a related bias to the bases of both said main and said compensating transistors; for establishing that changes in the base to emitter voltages of both said main and said compensating transistors due to ambient temperature changes cause no change in potential drop across the first and second resistive loads and do not alter the current in either of said main transistors.

* * * * *